UNITED STATES PATENT OFFICE.

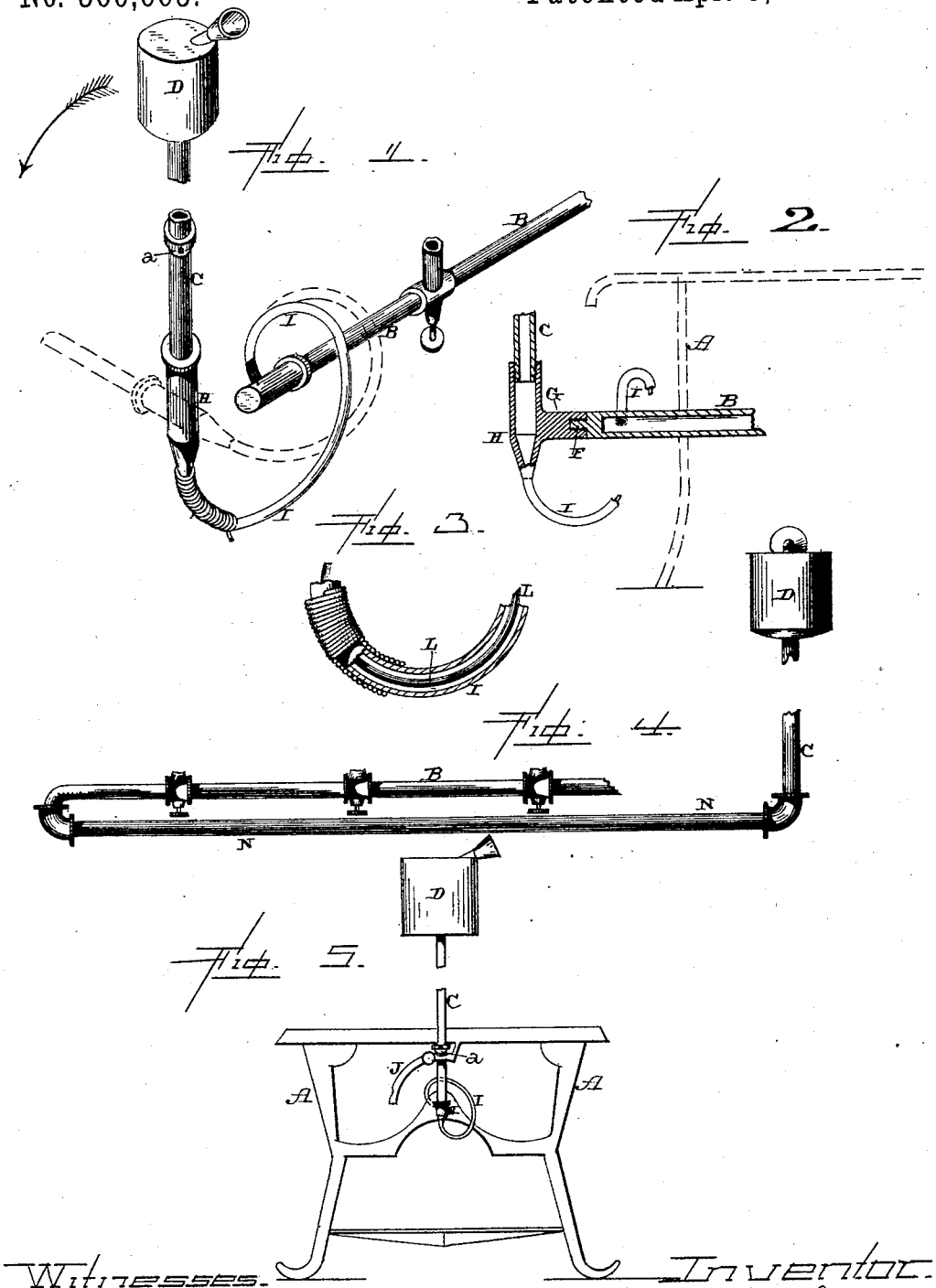

ZEBULON DAVIS, OF CLEVELAND, OHIO.

VAPOR-STOVE ATTACHMENT.

SPECIFICATION forming part of Letters Patent No. 360,665, dated April 5, 1887.

Application filed October 26, 1886. Serial No. 217,203. (No model.)

*To all whom it may concern:*

Be it known that I, ZEBULON DAVIS, of Cleveland, in the county of Cuyahoga and State of Ohio, have invented certain new and useful Improvements in Vapor-Stove Attachments; and I do hereby declare the following to be a full, clear, and exact description of the invention, such as will enable others skilled in the art to which it pertains to make and use it, reference being had to the accompanying drawings, which form part of this specification.

My invention relates to an improvement in vapor-burner stoves; and it consists in the combination of a horizontal supply-pipe, upon which the burners are secured, a turned-down tank, and a flexible connection placed between the lower end of the pipe which leads from the tank and the outer end of the horizontal pipe upon which the burners are placed, the flexible pipe being made to form a connection between the two pipes, all of which will be more fully described hereinafter.

The object of this part of my invention is to do away with the swiveled joint and the packing which is necessary to make a tight joint, and to connect the ends of the two pipes together, so as to form practically a single pipe.

The second part of my invention consists in the combination of the horizontal stationary pipe, on which the burners are placed, a turned-down or tilting tank, and a flexible pipe, which unites the ends of the horizontal and vertical pipes together, the flexible pipe being wrapped with wire and provided with a spring wire or rod upon its inner side. The object of this part of my invention is to place inside of a soft flexible pipe a spring which will distribute the strain exerted in turning the tank down to be filled evenly over the entire surface of the soft or yielding pipe, and thus prevent it from unduly wearing or breaking at any one point, and to protect the outer surface of this soft pipe by means of a wrapping of spring-wire, which not only protects the surface of the pipe from injury, but assists in distributing the strain exerted in turning the tank down to be filled evenly throughout its entire length.

Figure 1 is a perspective of an apparatus embodying my invention, the horizontal pipe upon which the burners are placed and the vertical tank-pipe being shown as entirely separated from each other. Fig. 2 is a vertical section of a modification of the invention shown in Fig. 1. Fig. 3 is a detached view, partly in section, of the flexible pipe by itself. Fig. 4 shows a modification of my invention. Fig. 5 shows an end view of a vapor-stove frame with the different parts which embody my invention in position.

A represents the frame of a vapor-stove, and B the horizontal pipe, upon which the burners are placed in the usual manner. This pipe B is secured in the frame so as to be stationary at all times. That end of the pipe which projects through the end of the frame, as shown in Fig. 2, is closed, and may be entirely separate from the vertical pipe C, which leads from the tank D; or the pipe B may have a screw-tenon, F, upon its outer end, so as to fit into a screw-threaded socket, G, which is formed upon the casting H, which is secured to the lower end of the vertical pipe C. It is a matter of choice whether this tenon and socket shall be used or not. When they are used, they form a support for the tank D and pipe C, but serve no other purpose.

When the tenon and socket are not used, as shown in Fig. 2, the tank D, pipe C, and casting H may be supported entirely by the flexible pipe I, which in that case is made heavier; or the tank D, pipe C, and casting H may be supported by means of one or more friction-rollers, *a*, or other suitable bearings or devices, which catch upon the top of the usual quadrant, J, which is formed upon the end of the frame A, as shown in Fig. 5, for supporting the tank D when in a turned-down position to be filled. The tank, its pipe C, and the casing H may be supported in either one of the three ways shown, or in any other manner that may be preferred, as this forms no special part of this invention.

Connecting the outer end of the horizontal stationary pipe B and the lower end of the casting H is a flexible pipe, I, which may be made of any suitable flexible metal, or other material which is impervious to gasoline. In some cases this pipe I will be formed of flexible brass or steel and curved into the form of a spiral spring, and through which pipe I, at all times, the gasoline flows freely from the tank into the horizontal pipe B. This flexible pipe I forms a conduit or continuous connection without a joint of any kind. Where brass or steel are used the pipe may be made sufficiently strong to support the tank in any position, the leverage exerted by the tank D and pipe C in being turned down to be filled being sufficiently great to overcome the rigidity or resistance of the flexible pipe I. When the tank is turned down to be filled, as shown in dotted lines in Fig. 1, the pipe I changes its form into something like what is shown by dotted lines, and then when the tank is returned to a vertical position the pipe I again resumes its original shape.

In case the pipe I should be made of lead, copper, or any similar soft ductile metal or of yielding but not elastic or resilient material of any kind which is impervious to gasoline, I place inside of it a spring rod or wire, L, which assumes the curved shape of the pipe, and which serves to diffuse the strain exerted upon the pipe I in turning the tank down evenly throughout its entire surface, and prevents the pipe at any place from being unduly worn, strained, or broken. When the pipe I is made of lead or any soft material which might accidentally be injured, it is preferable to cover this pipe with spring-wire of any kind, which is wrapped closely around the pipe from end to end, and which not only forms a protecting-surface, but at the same time assists in distributing the strain exerted upon the pipe evenly from one end to the other. Where the pipe I is made of brass, steel, or similar spring material, the inside spring and the outside cover of wire may be, if desired, entirely dispensed with.

In case it should not be desired to connect the lower end of the pipe C and the outer end of the pipe D together by means of a short flexible pipe, I, as shown in Figs. 1 and 2, a long elastic pipe, N, will be used, as shown in Fig. 4, and which has one end rigidly secured to the pipe B by means of a coupling or any other suitable means. When the tank is turned down to be filled, a torsional strain is exerted upon this pipe while the tank is in a turned-down position, thus causing the pipe to partially rotate upon its own axial center. When the tank is returned to position, the strain is at once taken from the pipe, which resumes its orginal position.

Heretofore turned-down tanks have been used, but always in connection with a swiveled joint, and which requires to be carefully packed. After the lapse of a short time the packing becomes worn from simply turning the tank down to fill it, whenever necessary, and then the joints leak and become a source of danger. These stoves being almost entirely in the hands of women, who do not understand the packing of joints, the services of skilled workmen are then required. Should the leak not be discovered and promptly stopped, there is great danger from fire or explosion. It will be seen that by the construction above described this joint is entirely done away with, and only a continuous pipe is used.

Having thus described my invention, I claim—

1. The combination of the stationary pipe upon which the burners are placed, the tank, the vertical pipe leading therefrom, and a flexible connection placed between the two pipes, for the purpose described.

2. The combination of the horizontal pipe B, the flexible pipe I, which is connected thereto at one end, and the pipe C, leading from the tank D, and to the lower end of which the other end of the flexible pipe I is connected, substantially as shown and described.

3. The combination of the tank D, the pipe C, leading therefrom, the flexible pipe I, and the horizontal pipe B with a spring wire or rod, which is placed inside of the flexible pipe I, substantially as set forth.

4. The combination of the stationary pipe B, upon which the burners are placed, the flexible pipe I, connected thereto, the pipe C, and tank D with the wire covering which is applied to the flexible pipe, substantially as specified.

5. The combination of the tank D, the pipe C, leading therefrom, the flexible pipe, and the horizontal pipe, upon which the burners are placed, with the quadrant and a bearing upon the pipe C to rest upon the top of the quadrant and support the tank in position, substantially as shown.

In testimony whereof I affix my signature in presence of two witnesses.

ZEBULON DAVIS.

Witnesses:
  A. S. PATTISON,
  A. W. BRECHT.